United States Patent Office 3,567,555
Patented Mar. 2, 1971

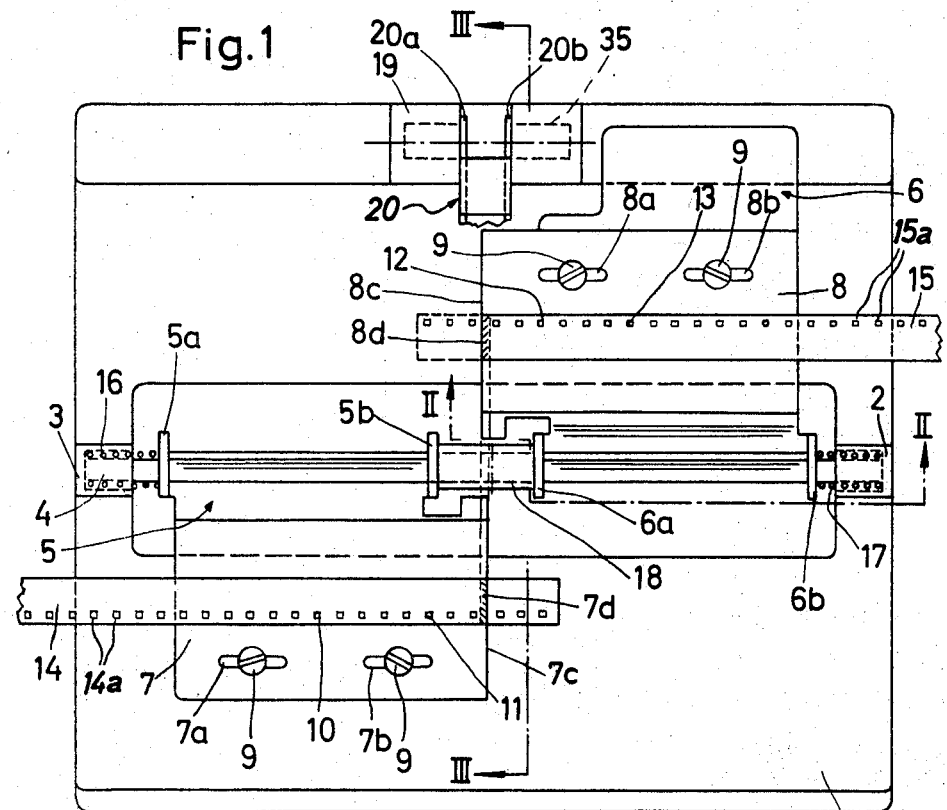
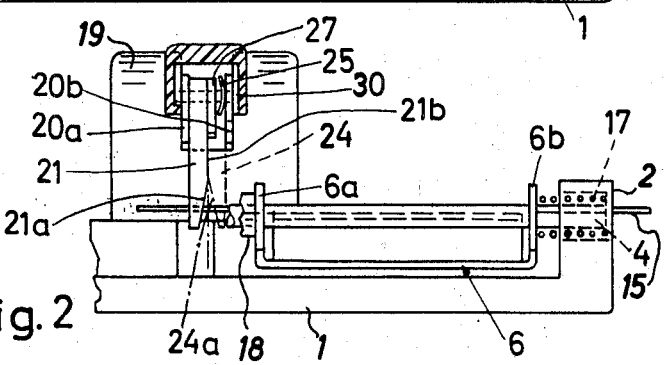

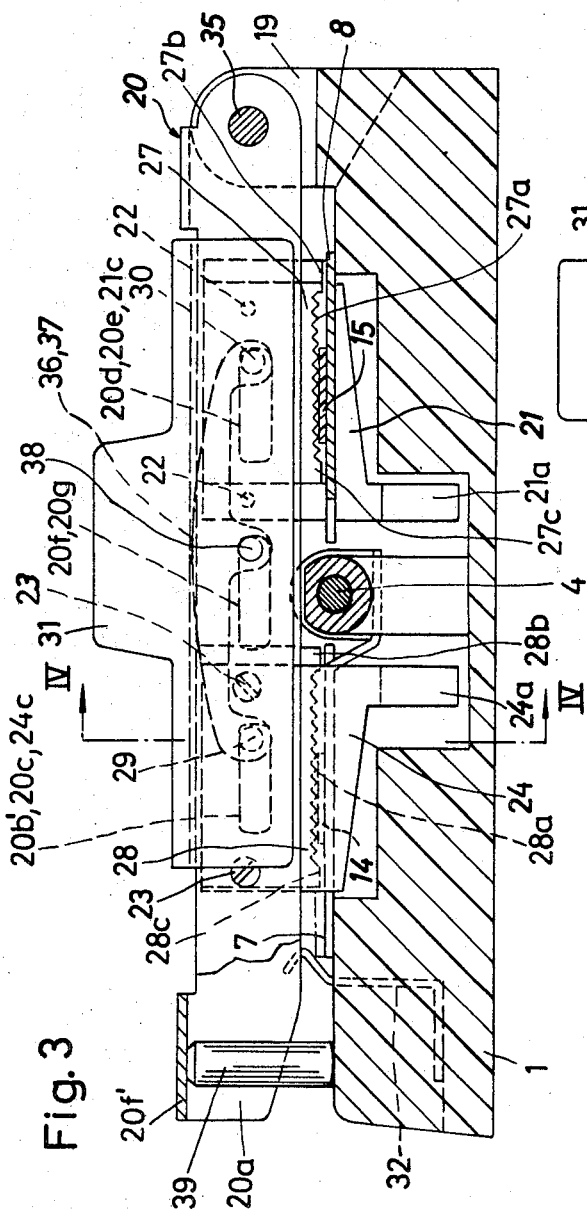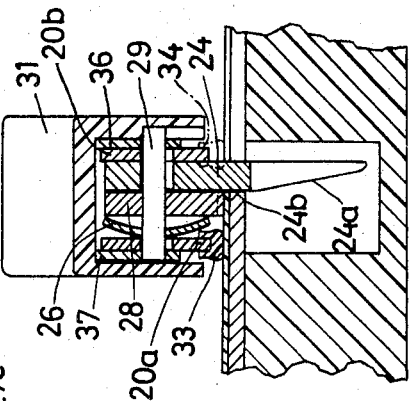

3,567,555
APPARATUS FOR SPLICING FILMS OR THE LIKE
Volkmar Stenzenberger and Hermann Müller, Munich, Germany, assignors to Agfa-Gevaert Aktiengesellschaft, Leverkusen, Germany
Filed Dec. 5, 1968, Ser. No. 781,312
Claims priority, application Germany, Dec. 16, 1967, P 15 97 661.1
Int. Cl. G03d 15/04
U.S. Cl. 156—502
17 Claims

ABSTRACT OF THE DISCLOSURE

A portable film splicing apparatus wherein two film supporting platforms can turn on a shaft and are biased axially toward each other to normally bear against the opposite ends of a distancing sleeve on the shaft. One of the platforms is pivotable on the shaft between a first position in which the film portions on the two platforms are parallel to and coplanar with each other and a second position in which the film portions overlie and bear against each other. Two knives can be pivoted into engagement with counterknives on the platforms in the first position of the one platform to trim the corresponding film portions and to simultaneously move the platforms away from the distancing sleeve. Such knives are adjacent to two scraping members which can be reciprocated by hand to roughen the film portions adjacent to their trimmed ends. The thus roughened film portions are coated with adhesive after the knives are moved away from the platforms so that the one platform can be pivoted to second position in which the adhesive-coated film portions are cemented to each other to form a lap splice.

BACKGROUND OF THE INVENTION

The present invention relates to splicing apparatus, and more particularly to improvements in apparatus which can be employed to form a cemented lap splice between the ends of photographic films or similar band-like or tape-like materials.

When two portions of perforated photographic film are to be joined to each other by a splice, the operator must make sure that the distance between the perforations flanking the splice is a whole multiple of the distance between the perforations in an unspliced portion of the film. In this way, the teeth of film transporting sprockets can enter the perforations at both ends of the splice to advance the film without slippage and without tearing along the edges of perforations.

SUMMARY OF THE INVENTION

It is an object of the present invention to provide a preferably portable splicing apparatus which can be employed to unite the ends of films by means of a suitable adhesive and which is designed to insure that the resulting lap splice does not interfere with proper transport of perforated film in a motion picture camera, projector or another apparatus which employs perforated film.

Another object of the invention is to provide an apparatus which is capable of properly trimming the ends of two portions of film prior to splicing and which can also treat the surfaces which are to be coated with adhesive prior to formation of the splice.

A further object of the invention is to provide a simple splicing apparatus which can be utilized by amateurs as well as by professionals and which can be readily adjusted to compensate for eventual inaccuracies in the machining of its parts and/or for other factors which might affect the accuracy and/or quality of the splice.

The invention is embodied in an apparatus for splicing bands, particularly for splicing poritons of roll film, which comprises first and second band supporting members at least the first of which is pivotable about a fixed axis between a first position in which the band portions supported by such members are substantially coplanar and preferably parallel to each other and a second position in which the two band portions overlie and preferably abut against each other, means for biasing at least one of the supporting members in the direction of the axis toward a fixed stop which limits axial movement of the one supporting member, counterknives provided on the supporting members, a pair of knives which are preferably pivotable to operative positions in which they cooperate with the counterknives to trim the ends of band portions and to move the one supporting member away from the fixed stop, and a pair of scraping members which are preferably movable with the knives and can be reciprocated by hand in the operative positions of knives to roughen the band portions adjacent to their trimmed ends. Once the band portions are trimmed and roughened, the knives and the scraping members are moved away from operative positions so that the roughened part of at least one of the band portions can be coated with an adhesive, and the first supporting member is thereupon pivoted to second position to press the roughened parts against each other to thus insure the formation of a strong lap splice.

The novel features which are considered as characteristic of the invention are set forth in particular in the appended claims. The improved splicing apparatus itself, however, both as to its construction and its mode of operation, together with additional features and advantages thereof, will be best understood upon perusal of the following detailed description of a specific embodiment with reference to the accompanying drawing.

BRIEF DESCRIPTION OF THE DRAWING

FIG. 1 is a plan view of a splicing apparatus which embodies the invention, with a portion of the holder for the knives broken away;

FIG. 2 is a fragmentary vertical sectional view as seen in the direction of arrows from the line II—II of FIG. 1;

FIG. 3 is an enlarged vertical sectional view as seen in the direction of arrows from the line III—III of FIG. 1; and FIG. 4 is a fragmentary vertical sectional view as seen in the direction of arrows from the line IV—IV of FIG. 3.

DESCRIPTION OF THE PREFERRED EMBODIMENT

The splicing apparatus which is shown in FIG. 1 comprises a base plate or main support 1 which carries upstanding blocks or posts 2, 3 serving as bearings for the ends of an elongated horizontal shaft 4. The latter supports two U-shaped carriers 5, 6 which are turnable thereon and respectively mount film-supporting members here shown as platforms 7 and 8. These platforms are adjustably secured to the respective carriers by pin-and-slot connections or couplings including screws 9 which respectively extend through elongated slots 7a, 7b and 8a, 8b of the corresponding platforms and mesh with the carriers. The platforms are adjustable in the direction of the axis of the shaft 4, i.e., in the longitudinal direction of two portions 14, 15 of photographic film which are to be spliced to each other, and these platforms are respectively provided with locating pins 10, 11 and 12, 13 which can enter the perforations 14a, 15a of the film portions to thus insure that a lap splice is formed in such a way that the distance bebtween the perforations 14a, 15a nearest to the splice is the same as that between the remaining perforations of the film portion 14 or 15. Those edge portions (7c and 8c) of the platforms 7, 8 which are adjacent to each other constitute two counterknives and cooperate with movable knives which will be described later to trim the ends of the respective film portions prior to formation of the lap splice. The portions 7d, 8d of the platforms 7, 8 are immediately adjacent to the counterknives 7c, 8c and overlap each other when one of the carriers 5, 6 is turned through 180 degrees about the axis of the shaft 4, and such overlapping marginal portions 7d, 8d are respectively indicated by hatching. The overlap is desirable to make sure that, once the trimmed film portions 14, 15 are coated with a suitable adhesive, the thus coated portions adhere to each other in response to compression between the marginal portions 7d and 8d.

The shaft 4 further carries two helical compression springs 16, 17 which are partially concealed in the blocks 3, 2 and serve to bias the carriers 5, 6 toward each other. These carriers respectively comprise outer flanges 5a, 6b which are biased by the springs 16, 17 and inner flanges 5b, 6a which bear against a distancing sleeve or stop 18 on the median portion of the shaft 4. It will be seen that the springs 16, 17 respectively bear against the flanges 5a, 6b and respectively react against the blocks 3 and 2. The sleeve or stop 18 cooperates with the springs 16, 17 to insure that the marginal portions 7d, 8d of the platforms 7, 8 normally overlap; such springs permit axial movement of the carriers 5, 6 and of the respective platforms 7, 8 away from each other.

The base plate 1 further supports an upstanding bracket 19 which serves as a support for a two-piece holder 20 comprising spaced flat arms 20a, 20b. The arm 20a is affixed to a knife or cutter 21 by means of screws 22 whose heads are recessed into the arm. The other arm 20b carries a second knife or cutter 24 which is affixed thereto by screws 23 similar to the screws 22. The knives 21, 24 are respectively provided with inclined side faces 21a and 24a which cooperate with the aforementioned counterknives 7c, 8d of the platform 7, 8 and can shift the carriers 5, 6 axially against the opposition of compression springs 16, 17 when the holder 20 is pivoted to operative position. The holder 20 further carries two scraping or roughening tools 27, 28 which are respectively biased against the knives 21, 24 by leaf springs 25, 26 shown in FIGS. 2 and 4. The tools 27, 28 are formed with toothed or serrated scraping edges 27a, 28a shown in FIG. 3. Furthermore, the tools 27, 28 are respectively formed with pairs of stops 27b, 27c and 28b, 28c which extend beyond and flank the corresponding serrated portions 27a, 28a. When the holder 20 is pivoted to operative position (shown in FIG. 3), the stops 27b, 27c and 28b, 28c respectively abut against the upper sides of platforms 7 and 8 to insure that the serrations 27a, 28a penetrate into the exposed surfaces of film portions 15, 14 to the same extent. Each of the scraping tools 27, 28 is mounted on the arms of two-armed motion transmitting levers 36, 37 flanking the arms 20b, 20a of the holder 20. The tool 28 is affixed to the left-hand arms of the levers 36, 37 by a transverse horizontal pin 29, and a similar pin 30 couples the tool 27 to the right-hand arms of the levers 36, 37, as viewed in FIG. 3. The levers 36, 37 are fulcrumed on a pivot pin 38 which is mounted in a manually operated handle 31 so that the pressure applied by hand against the handle 31 is divided equally to both scraping tools when the operator wishes to carry out a scraping or roughening operation. The handle 31 also serves as means for reciprocating the levers 36, 37 and the tools 27, 28 transversely of the film portions 14, 15. As shown in FIG. 3, the pins 29, 30 and 38 extend through elongated guide slots 20b', 20c, 24c; 20d, 20e, 21c; 20f, 20g formed in the arms 20a, 20b and knives 21, 24. The width of the guide slots exceeds somewhat the diameters of the respective pins so that the scraping tools 27, 28 have limited freedom of movement up and down when the holder 20 is maintained in the operative position of FIG. 3. Moreover, such slots cooperate with the pins 29, 30 and 38 to prevent separation of the handle 31 from the holder 20. Since each of the scraping tools 27, 28 is mounted on a single pin (30, 29), their serrated portions 27a, 28a can readily assume such positions of inclination that they are parallel to the planes of film portions 15 and 14.

The base plate 1 further supports an upstanding arresting post 39 which extends into the space between the arms 20a, 20b and abuts against a connecting web 20f' at the outer ends of these arms to thus arrest and locate the holder 20 in operative position. The post 39 then cooperates with the arms 20a, 20b to prevent lateral movements of the holder. A detent spring 32 is mounted in the base plate 1 to temporarily hold the carrier 6 in its folded-over or turned-over position (subsequent to turning of the carrier 6 through 180 degrees in a counterclockwise direction, as viewed in FIG. 3) in which the marginal portions 8d, 7d cooperate to compress the adhesive coats applied to serrated zones of trimmed film portions 14, 15. The bias of the spring 32 is strong enough to furnish a pressure which suffices to insure the formation of a strong bond between the film portions.

The holder 20 is preferably provided with elastic cushioning means in the form of pads 33, 34 which urge the film portions 14, 15 against the respective platforms during trimming and scraping. The cushions 33, 34 preferably consist of synthetic plastic material and engage the respective film portions close to the splicing station. The numeral 35 denotes a pivot pin which connects one end of the holder 20 to the bracket 19.

The operation:

The ends of the film portions 14, 15 are placed onto the platforms 7, 8 in such a way that they extend beyond the counterknives 7c, 8c and that the locating pins 10, 11 and 12, 13 respectively extend into the perforations 14a and 15a. The holder 20 is then pivoted about the axis of the pin 35 toward the operative position shown in FIG. 3 in which its web 20f' abuts against the arresting post 39. During such pivotal movement of the holder 20, the cutting edges 7c, 8c of the platforms 7, 8 are respectively engaged by the inclined side faces 24a, 21a of the cutters 24 and 21 whereby such side faces cause the platforms 7, 8 to move away from each other (i.e., in the axial direction of the shaft 4) so that the cutting edges 21b, 24b of the knives 21, 24 can cooperate with the cutting edges 8c, 7c to sever or trim the ends of film portions 15, 14. The handle 31 is thereupon grasped by hand and is reciprocated in the longitudinal direction of the holder 20. The scraping edges 27a, 28a of the tools 27, 28 thereby scrape the upper sides of film portions 15, 14 adjacent to their trimmed ends whereby the stops 27b, 27c and 28b, 28c insure that each of the film portions is scraped to the same depth. In the next step, the holder 20 is returned to inoperative position, i.e., it is pivoted in a clockwise direction, as viewed in FIG. 3, so that the springs 16, 17 are free to expand and return the flanges 5b, 6a into abutment with the distancing sleeve or stop 18. The operator thereupon applies one or more coats of adhesive to the scraped surface of film portion 14 and/or 15, and the holder 6 is subsequently pivoted through 180 degrees so that the marginal portion 8d of the platform 8 moves toward the marginal portion 7d of the platform 7. In this way, the adhesive-coated scraped surfaces of the film portions 14, 15 are pressed together for a period of time which is necessary to insure the formation of a satisfactory lap splice. The detent spring 32 automatically engages and holds the carrier 6 in inverted position. The operator thereupon flexes the exposed end of the spring 32 to release the carrier 6 and the latter is returned to the position shown in FIG. 1 so that the film (which by now includes the film portions 14, 15) can be detached from the locating pins 10, 11 or 12, 13.

It will be seen that, during the entire splicing operation, the carrier 5 need not change its angular position with reference to the axis of the shaft 4. Therefore, it suffices to mount the carrier 5 for mere axial movement along the shaft 4. However, the provision of two similar pivotable carriers is normally preferred because the carriers may be produced in the same machine and also because the splicing appaatus is more readily adjustable if it embodies two pivotable carriers. It is also clear that the platforms 7, 8 can be made integral or rigid with the respective carriers as well as that the springs 16, 17 can be replaced by a single spring which draws the flanges 5b, 6a against the adjoining ends of the distancing sleeve 18. It is also sufficient if only one of the carriers 4, 6 is movable axially of the shaft 4.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. In an apparatus for splicing bands, particularly for splicing two portions of photographic film, a combination comprising first and second band supporting members at least the first of which is pivotable about a predetermined axis between a first position in which the band portions supported by said members are substantially coplanar and a second position in which such band portions overlie each other, at least one of said supporting members being movable in the direction of said axis and said supporting members comprising counterknives extending substantially at right angles to said axis; means for biasing said one supporting member axially; stop means for limiting the extent of axial movement of said one supporting member under the action of said biasing means; a pair of knives movable to operative positions in which each thereof cooperates with one of said counterknives to trim the respective band portion in the first position of said first supporting member, each of said knives comprising a cutting edge; holder means supportingly connected with and arranged to move said knives to and from said operative positions; a pair of scraping members each arranged to scrape one of said band portions in operative positions of said knives, each of said scraping members being adjacent to one of said cutting edges; and resilient means for biasing said scraping members against the respective knives.

2. A combination as defined in claim 1, wherein said first supporting member is pivotable through an angle of about 180 degrees.

3. A combination as defined in claim 1, wherein said stop means is located between said supporting members.

4. A combination as defined in claim 1, wherein the counterknife of said one supporting member cooperates with the corresponding knife to move said one supporting member against the opposition of said biasing means in response to movement of said knives to operative positions.

5. A combination as defined in claim 4, wherein said last mentioned knife is provided with an inclined side face which engages with the corresponding counterknife to move said one supporting member away from said stop means in response to movement of said knives to operative positions.

6. A combination as defined in claim 1, wherein said holder means is pivotable about an axis which is substantially parallel to said first mentioned axis.

7. A combination as defined in claim 1, wherein said holder means comprises elastic cushioning means which biases the band portions against the respective supporting members in operative positions of said knives.

8. A combination as defined in claim 7, wherein said cushioning means comprises two pads of synthetic plastic material.

9. A combination as defined in claim 1, further comprising a main support for said supporting members and said holder means, said holder means being pivotable with reference to said main support and further comprising means for arresting said holder means in operative positions of said knives.

10. A combination as defined in claim 9, wherein said arresting means is mounted on said main support and said holder means comprises a portion which abuts against said arresting means in operative positions of said knives.

11. A combination as defined in claim 1, further comprising manually operated means for moving said scraping members with reference to said supporting members.

12. A combination as defined in claim 11, wherein said scraping members comprise stop means arranged to abut against the respective supporting members to thereby determine the extent of scraping action in response to displacement of said scraping members by way of said manually operated means.

13. A combination as defined in claim 11, further comprising motion transmitting means pivotally securing said scraping members to said manually operated means.

14. A combination as defined in claim 1, further comprising a pair of carrier means, one for each of said supporting members, and coupling means adjustably connecting said supporting members to the respective carrier means, the carrier means for said first supporting member being pivotable therewith and the carrier means for said one supporting member being movable axially therewith.

15. A combination as defined in claim 14, wherein each of said coupling means comprises a pin-and-slot connection permitting adjustment of the respective supporting member in the direction of said axis.

16. A combination as defined in claim 1, wherein each of said supporting members is provided with locating means for the respective band portion.

17. A combination as defined in claim 1, further comprising a shaft defining said axis, said first supporting member being pivotable on said shaft and said stop means comprising a distancing member provided on said shaft at one axial end of said first supporting member, said biasing means comprising helical spring means surrounding said shaft and arranged to bias said one supporting member against said distancing member.

References Cited
UNITED STATES PATENTS
3,346,437   10/1967   Post et al. _____ 156—505

FOREIGN PATENTS
990,470   9/1951   France _____ 156—502
1,083,653   6/1960   Germany _____ 156—509

SAMUEL FEINBERG, Primary Examiner

R. E. HART, Assistant Examiner

U.S. Cl. X.R.

156—508, 509